United States Patent [11] 3,574,934

[72] Inventor Ralph A. De Rose
Villa Park, Ill.
[21] Appl. No. 734,065
[22] Filed June 3, 1968
[45] Patented Apr. 13, 1971
[73] Assignee International Telephone & Telegraph Corporation
New York, N.Y.

[54] METHOD OF SECURING COMPONENTS TO A CIRCUIT BOARD

1 Claim, 11 Drawing Figs.

[52] U.S. Cl. .......... 29/626, 29/33, 29/430, 29/203, 29/471.9, 228/17, 228/37, 83/925
[51] Int. Cl. .......... H05k 3/30
[50] Field of Search .......... 228/13, 17, 37—40; 29/626, 203, 33.10 (Inquired), 430; 83/925, 923

[56] References Cited

UNITED STATES PATENTS

| | | | |
|---|---|---|---|
| 3,218,193 | 11/1965 | Isaacson .......... | 29/626UX |
| 3,278,880 | 11/1966 | Lewis et al. .......... | 29/630GUX |
| 3,277,566 | 10/1966 | Christensen .......... | 228/37X |
| 3,307,442 | 3/1967 | Imhoff .......... | 83/925X |
| 3,393,437 | 7/1968 | Hutchinson et al. .......... | 29/203 |
| 3,416,348 | 12/1968 | Carter, Jr. et al. .......... | 29/626UX |

*Primary Examiner*—John F. Campbell
*Assistant Examiner*—Robert W. Church
*Attorneys*—C. Cornell Remsen, Jr., Rayson P. Morris, Percy P. Lantzy, J. Warren Whitesel and Delbert P. Warner

ABSTRACT: A template made of steel or other hard material is identical with a printed circuit card with respect to the locations of holes for receiving component leads to be soldered to the printed circuit cards. The template and card are sandwiched together at the start of production. Then, all components are mounted with their leads projecting through the bottom of the template. Thereafter, they are cut off flush with the bottom of the template. Next, the template is removed to expose the stub ends of the leads. Then a roller is run across the bottom of the card, and the leads are bent over into a presoldering position.

Patented April 13, 1971 3,574,934

4 Sheets-Sheet 1

INVENTOR
RALPH A. DEROSE

BY [signature]
ATTORNEY

Patented April 13, 1971 3,574,934

4 Sheets-Sheet 2

METHOD OF SECURING COMPONENTS TO A CIRCUIT BOARD

This invention relates to methods of and means for manufacturing assemblies comprising printed circuit cards having components mounted thereon and more particularly, to moderately high volume production of identical printed circuit boards.

Known techniques of printed circuit card manufacture range from manufacture by completely hand labor to automated production lines with almost no hand labor. When only hand labor is used on high volume items, the resulting printed circuit cards are relatively expensive to make. When automated production lines are set up, the initial costs are high before it is possible to enter into production. Thus, there has not been too much which can be done with known techniques when looking toward moderately large volume, low cost production. This class of production is relatively expensive because of either too much hand labor or too high an entry cost.

Accordingly, an object of the invention is to provide new and improved methods of and means for assembling printed cards having components mounted thereon. In greater detail, an object is to provide a moderately high volume production line which does not have a high initial cost. In this connection, an object is to provide an optimum mix of hand labor and automatic machine tools which give the lowest overall cost for the moderate volume production.

In keeping with an aspect of the invention, printed circuit cards may be manufactured by following the production steps of: (1) Preparing a hardened, wear resistant template having holes which match the holes used to mount components on a printed circuit card; (2) placing a printed circuit card over the template in a spaced parallel orientation with mounting holes aligned; (3) inserting component leads through the aligned holes in both the printed circuit card and the template; (4) cutting off the leads flush with the bottom of the template; (5) removing the template and rolling the leads to bend them up against the printed circuit card; and (6) flow soldering or otherwise attaching the leads to the card.

The above-mentioned and other features and objects of this invention and the manner of obtaining them will become more apparent, and the invention itself will be best understood by reference to the following description of an embodiment of the invention taken in conjunction with the accompanying drawings, in which.

Figure 6:
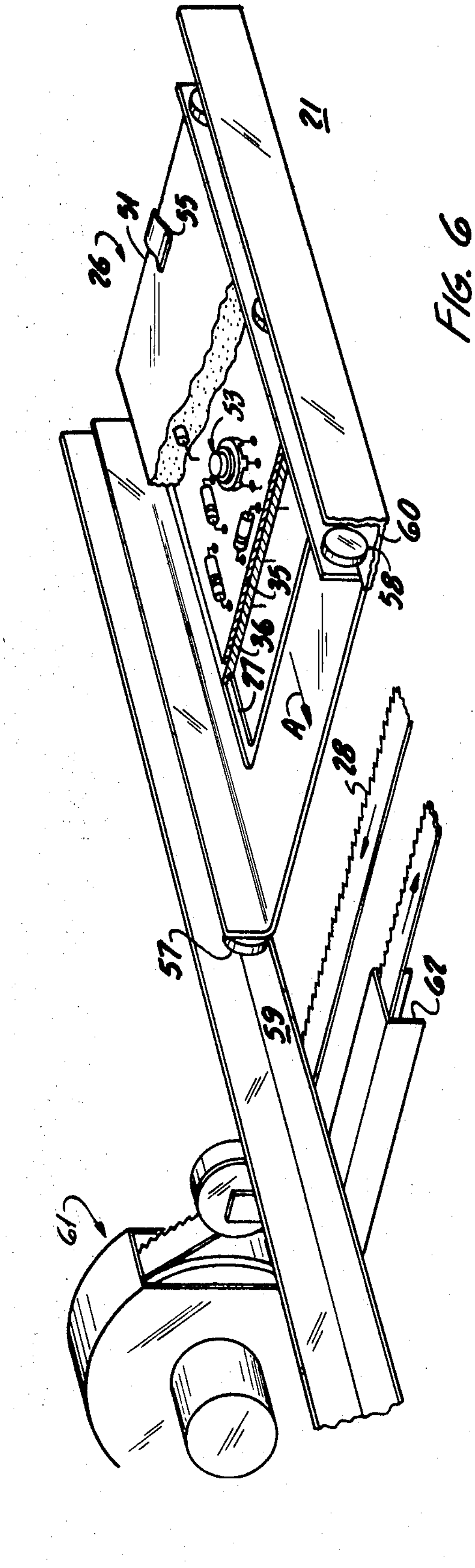
FIG. 6 is a perspective view of a first production line station having a tool for cutting off leads flush with the bottom of the template.
Figure 9:
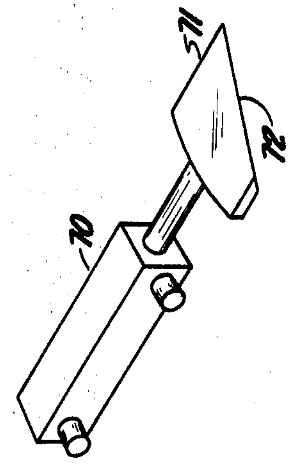
Figure 8:
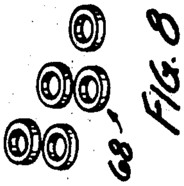
Figure 7:
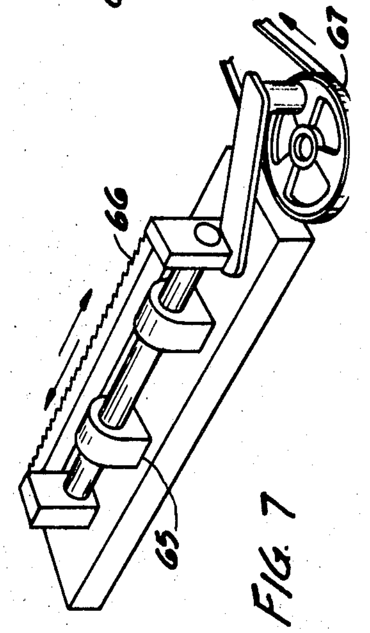
Figure 10:
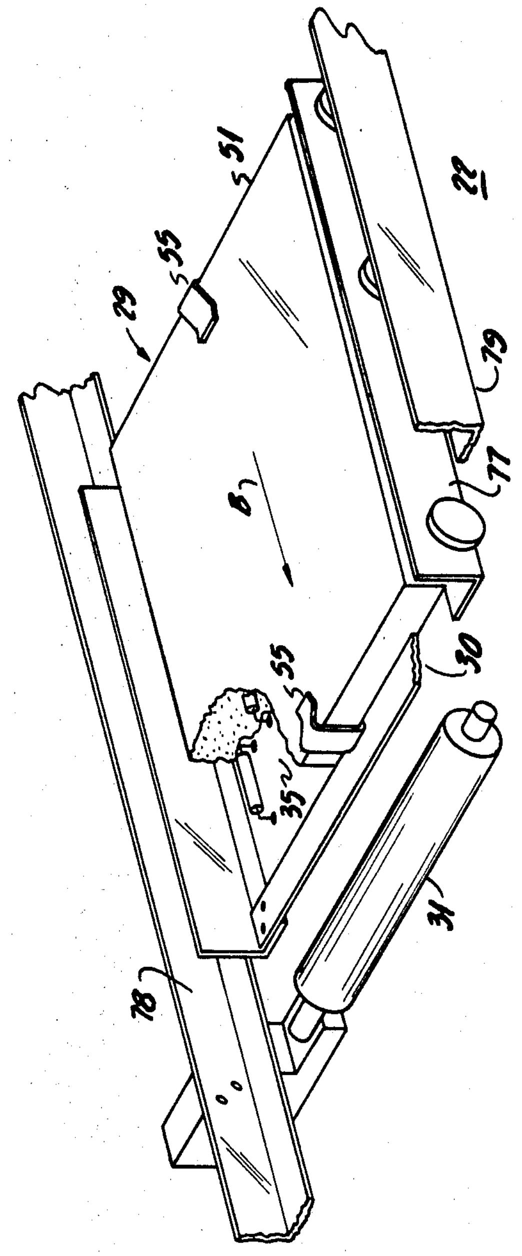
Figure 11:
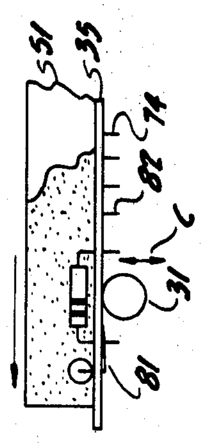

FIG. 7, 8, and 9 are perspective views which show alternative cutoff tools which are suitable for use in lieu of the tool of FIG. 6;

FIG. 10 is a perspective view of the production line station following the station of FIG. 6 and having a roller which may be used as tool for bending the component leads to a presoldering condition; and FIG. 11 is a side plan view showing how the leads are bent to the presoldering position.

A production line (FIG. 1) includes a source of printed circuit card 20, a component lead cutoff station 21, a component lead-bending station 22, and inspection station 23, and a flow solder station 24. The nature of the printed circuit, the form of components, and the production facilities used at 20 are irrelevant to the invention. Regardless of how they are made, printed circuit cards come down a conveyor belt 25 as assemblies with the components in place. The assemblies are placed on a first pallet (assembly 26 is shown on pallet 27) and run across any suitable means 28 for cutting off the component leads.

Thereafter, the assembly is forwarded to station 22 where it is put on another pallet after the template is removed (assembly 29 is shown on pallet 30), and then the pallet is run across a roller 31. The roller bends the component leads to a presoldering configuration. The assembly is removed and inspected at station 23 after which it is ready for soldering at station 24. Conventional flow solder machines, or any other suitable devices, are used during the solder process.

Figures 2, 3, 4:
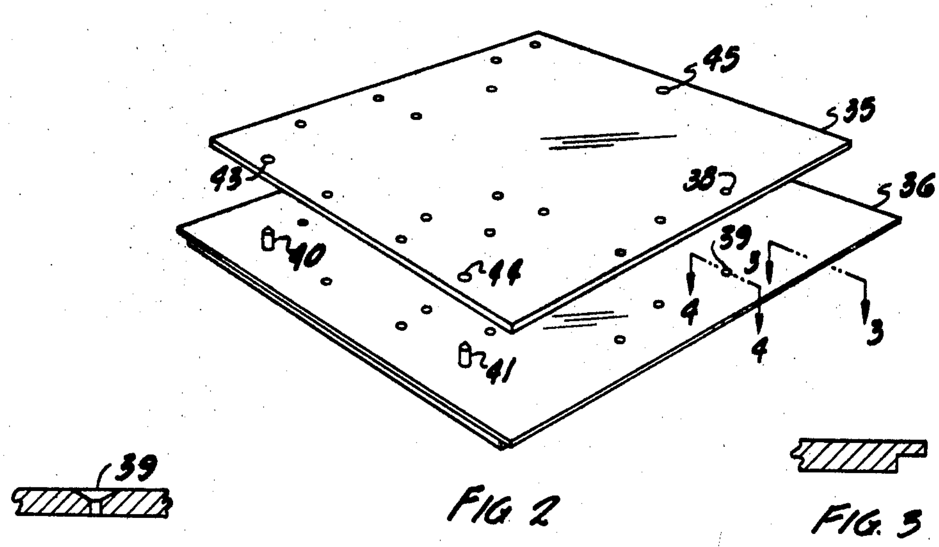
FIG. 2 is an exploded perspective view of a printed circuit card and associated template.
FIG. 3 is a cross-sectional view of a template edge taken along line 3–3 of FIG. 2 and showing a recess or track used to guide and position the printed circuit card during production.
FIG. 4 is a cross-sectional view, taken along line 4–4 of FIG. 2, and showing a somewhat funnel-shaped hole through a template which guides the leads of components when they are mounted on the printed circuit card.

The nature of the inventive process may become more apparent from a study of the remaining FIGS. In greater detail, the production begins with the preparation of printed circuit cards 35 and hardened templates 36 (FIG. 2). The template could be made from steel, for example. The printed circuit cards 35 are prepared in any known manner with suitably placed holes (such as 38) for receiving component leads. The template 36 is prepared to match the specific printed circuit card 35. Therefore, for every printed circuit card hole, such as 38, there is a correspondingly aligned hole, such as 39, in the template.

In one embodiment, the printed circuit card 35 is 0.062 inch thick, the template 36 is a steel plate 0.093 inch thick, and all holes are drilled. In another embodiment, the holes in the templates are formed by photoetching, using a process which is much the same as the process used to photoetch-printed circuit cards. As shown in FIG. 4, each hole in the template is somewhat funnel-shaped to guide the component leads through the template.

Figure 1:
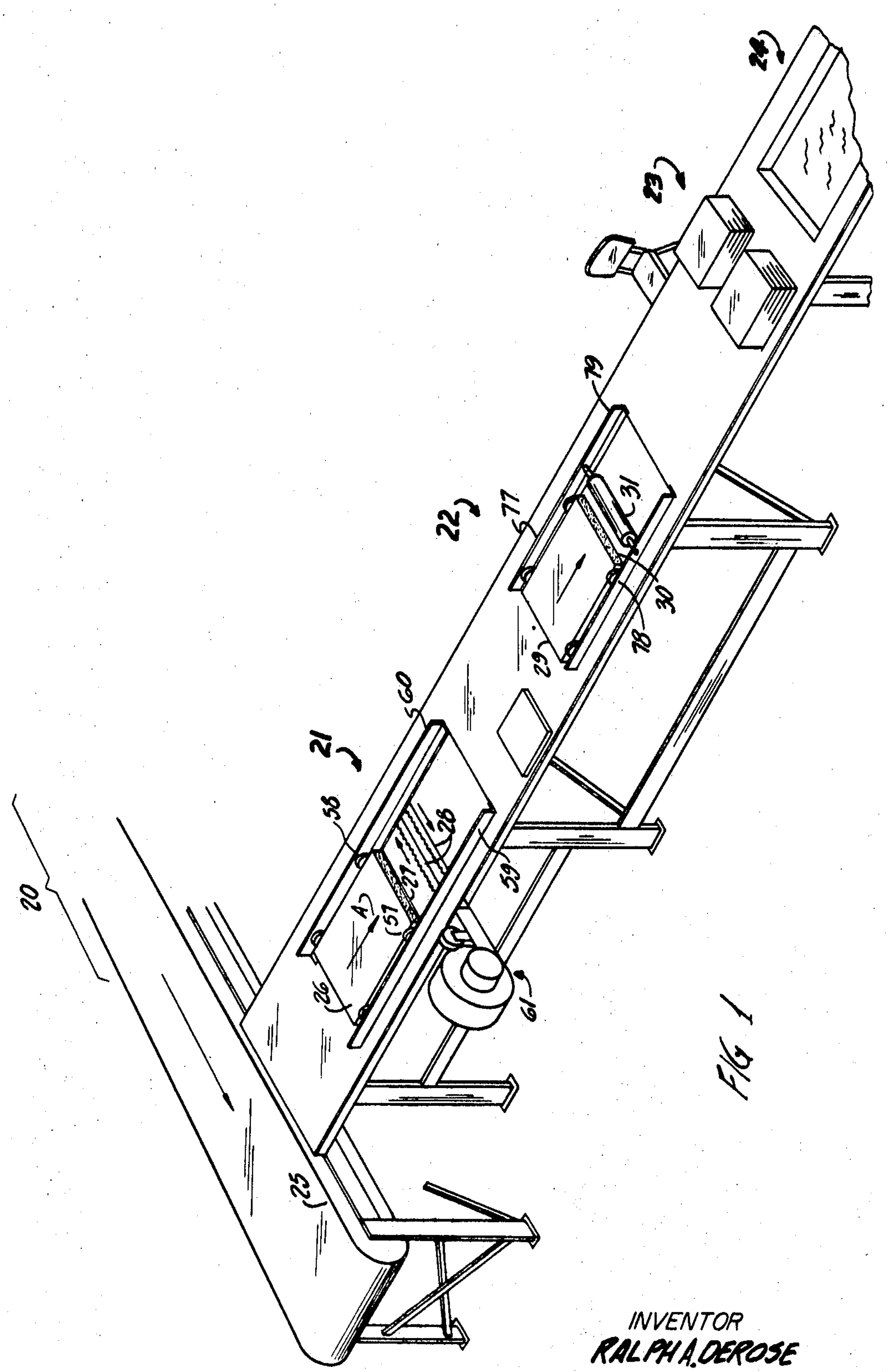
FIG. 1 is a general view of a production line incorporating the invention.

In addition, the template includes a number of fixing studs, such as 40, 41 and 42 for receiving corresponding located alignment holes, such as 43—45, respectively. These fixing studs position the printed circuit card 35 and the template 36 in a substantially perfect alignment. The edges of the template 36 are shaped with a recess or step, as shown in FIG. 3, to fit down into a pallet, such as 27 (FIG. 1). This insures a perfect alignment between the template, printed circuit card, and the associated machines.

Figure 5:
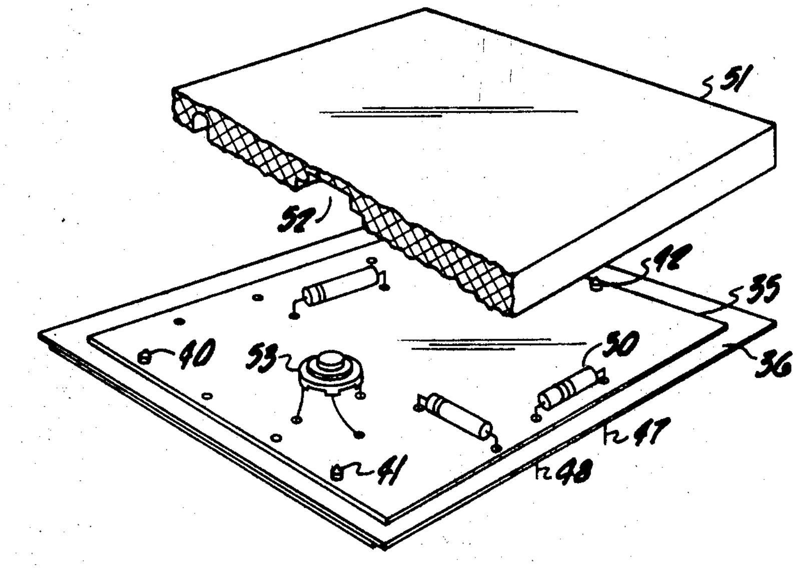
FIG. 5 shows, in perspective, the assembly of a printed circuit card and template with components in place and with a rigid, molded foam retainer pad poised over the assembly.

Thus, production of a printed circuit card (FIG. 5) begins when a card 35 is placed over the template 36 with the fixing studs 40—42, fitting into the holes 43—45, respectively. This forms a sandwich of the card and template. Then, the component leads are inserted through the aligned holes in both the printed circuit card and the template. For example, the leads 47, 48 of component 50 are shown as projecting below the template 36.

When all of the components are in place on the printed circuit card and template sandwich, a rigid molded foam pad 51 is placed over the top of the assembly to hold the components in place. According to one refinement, the under side of the pad 51 is cut out or otherwise formed to receive the components, as at the recess 52, which is designed to receive the transistor 53, for example. The pad 51 may be secured in place on the template 36 by any suitable means, such as spring clips 55, (FIG. 6) for example, thereby forming an assembly 26. Thereafter, the assembly 26 may be handled without any chance of losing any of the components inserted on the cards.

At production station 21, the assembly 26 is set on pallet 27 associated with a movable "truck" which is carried by wheels 57, 58 that run on parallel tracks 59, 60. As the assembly moves forward in the direction of arrow A, the component leads hanging down below the template 36 are sawed off by the band saw blade 28 which is running at high speeds responsive to the motive power of a drive 61. A duct 62 shields the return side of the saw blade.

Alternative methods of sawing off the component leads will readily occur to those who are skilled in the art. For example, FIG. 7 shows a linear slide bearing 65 supporting a reciprocating saw blade 66 driven from a motive source 67. FIG. 8 shows a number of rotating, overlapping, end cutters 68 for milling off the component leads. FIG. 9 shows an air cylinder 70 for pulling, or pushing, a cutting blade 71. The blade 71 is sharpened at 72 to cooperate with the bottom of the template 36 and thereby shear off the leads. Clearly, therefore, any of many suitable means may be used to saw, cut, or shear off the component leads substantially flush with the bottom of the template.

After the component leads are cutoff at the bottom of the template, it is removed. Since it has been assumed that the template is 0.093 inch thick, it should be apparent that every component lead (such as 74) FIG. 11 is projecting outwardly beyond the printed circuit card by approximately 0.093 inch. There is no particular significance to this specific length beyond the need for forming a good mechanical grip upon the board and providing an adequate solder length without a danger of short circuiting. Also, the lead length should be related to the diameter of the eyelet around the hole in the printed circuit card so that a good solder connection may be made regardless of the direction in which the leads are bent.

The assembly 29 is now placed on a pallet 30 at the production station 22. This station includes another wheeled "truck" 77 for carrying the pallet 76 along tracks 78, 79 in the direction of the arrow B. As it moves forward, the assembly 29 passes over an idler roller 31, which bends the contacts. For example, FIG. 11 shows the contacts 81 bent to a presoldering condition and contact 82 in an about to be bent position. The roller 31 is adjustable in height, as indicated by the double ended arrow C. After all of the leads are bent, the printed circuit card is ready for inspection and soldering.

While the principles of the invention have been described in connection with specific apparatus and applications, it is to be understood that this description is made only by way of example and not as a limitation on the scope of the invention.

I claim:

1. A method of assembling components to printed circuit boards comprising the steps of: (*a*) placing and aligning a printed circuit board having plural substantially laterally spaced and longitudinally spaced conductor lined openings upon a rigid, reusable template having holes alignable with the openings on the board, (*b*) mounting components on the board with the component leads extending through the aligned holes and openings, (*c*) affixing a holding plate temporarily to said board to retain the components on the board, (*d*) applying a cutting member to the leads extending through the template, and in a single pass severing all the leads substantially flush with the bottom of the template, (*e*) removing the template from the board and, (*f*) bending over the extending cut leads and causing same to engage the bottom side of the board and the conductive openings by making a single pass with a roller.